(12) United States Patent
Akaho (10) Patent No.: US 10,581,329 B2
(45) Date of Patent: Mar. 3, 2020

(54) SYNCHRONOUS RECTIFICATION TYPE DC/DC CONVERTER

(71) Applicant: ROHM Co., LTD., Kyoto (JP)

(72) Inventor: Tadashi Akaho, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 15/972,382

(22) Filed: May 7, 2018

(65) Prior Publication Data

US 2018/0331626 A1 Nov. 15, 2018

(51) Int. Cl.
*H02M 1/08* (2006.01)
*H02M 1/00* (2006.01)
*H02M 3/158* (2006.01)

(52) U.S. Cl.
CPC .......... *H02M 3/1588* (2013.01); *H02M 1/08* (2013.01); *H02M 2001/0054* (2013.01)

(58) Field of Classification Search
CPC .......... H02M 1/08; H02M 2001/0054; H02M 3/1588; H02M 3/158
See application file for complete search history.

(56) References Cited

U.S. PATENT DOCUMENTS

| | | | | |
|---|---|---|---|---|
| 9,760,101 B2* | 9/2017 | Fujiwara | .................... | G05F 1/10 |
| 10,008,932 B2* | 6/2018 | Umemoto | ............... | H02M 1/08 |
| 10,075,070 B2* | 9/2018 | Matsuki | .................. | H02M 1/08 |
| 2007/0236199 A1* | 10/2007 | Nakata | ................. | H02M 3/1588 |
| | | | | 323/282 |
| 2011/0043176 A1* | 2/2011 | Sohma | ................. | H02M 3/1588 |
| | | | | 323/282 |
| 2012/0249099 A1* | 10/2012 | Konecny | ................. | H03F 3/217 |
| | | | | 323/271 |
| 2014/0035533 A1* | 2/2014 | Akaho | ..................... | H02J 7/007 |
| | | | | 320/134 |
| 2014/0042998 A1* | 2/2014 | Saito | ....................... | G05F 1/468 |
| | | | | 323/271 |
| 2014/0043009 A1* | 2/2014 | Sakai | .................... | H02M 3/156 |
| | | | | 323/311 |
| 2016/0011610 A1* | 1/2016 | Hayashi | .............. | H02M 3/1588 |
| | | | | 348/730 |
| 2016/0079975 A1* | 3/2016 | Kinzer | ................. | H03K 17/687 |
| | | | | 327/109 |
| 2017/0070149 A1* | 3/2017 | Guan | ........................ | G05F 1/46 |

FOREIGN PATENT DOCUMENTS

WO  2017/065220 A1  4/2017

* cited by examiner

*Primary Examiner* — Adolf D Berhane
*Assistant Examiner* — Sisay G Tiku
(74) *Attorney, Agent, or Firm* — Chip Law Group (57) ABSTRACT

A control circuit for a DC/DC converter including P-channel and N-channel transistors. The control circuit includes: a pulse generator that generates first and second pulse signals for designating turning on/off of the P-channel and N-channel transistors such that a state of the DC/DC converter or a load approaches a target value; first and second drivers that drive the P-channel and N-channel transistors based on the first and second pulse signals; first to fourth lines individually connected to an upper side power supply terminal of the first driver, a lower side power supply terminal of the second driver, a lower side power supply terminal of the first driver, and an upper side power supply terminal of the second driver; and first and second regulators that stabilize voltages of the third and fourth lines to first and second given voltage values. A coupling capacitor is connected between the third and fourth lines.

13 Claims, 8 Drawing Sheets

SYNCHRONOUS RECTIFICATION TYPE DC/DC CONVERTER

CROSS REFERENCE TO RELATED APPLICATIONS

This U.S. Application claims priority benefit of Japanese Patent Application No. 2017-096490 filed in the Japan Patent Office on May 15, 2017. Each of the above-referenced applications is hereby incorporated herein by reference in its entirety.

BACKGROUND

The present disclosure relates to a direct current-to-direct current (DC/DC) converter.

In the past, various efficiency improving technologies have been proposed for a DC/DC converter that generates a desired DC output voltage from a DC input voltage.

For example, PCT Patent Publication No. WO2017/065220 (hereinafter referred to as Patent Document 1) by the applicant of the present application is directed to a control circuit for a DC/DC converter that includes a positive-channel (P-channel) transistor and a negative-channel (N-channel) transistor. The control circuit includes a pulse generator that generates a first pulse signal for designating turning on/off of a P-channel transistor and a second pulse signal for designate turning on/off of an N-channel transistor such that the state of the DC/DC converter or a load approaches a target value, a first driver that drives the P-channel transistor based on the first pulse signal, a second driver that drives the N-channel transistor based on the second pulse signal, and a common line connected to a lower side power supply terminal of the first driver and an upper side power supply terminal of the second driver. The voltage of the common line is stabilized to a predetermined voltage value between a voltage of a first line connected to an upper side power supply terminal of the first driver and a voltage of a second line connected to a lower side power supply terminal of the second driver.

When the gate voltage of the P-channel transistor is changed to a low level, discharge current is sunk by the first driver. Although the discharge current is discarded to the ground, in this mode, the discharge current is supplied to the common line and accumulated. Then, the second driver utilizes the sunken discharge current to drive the gate capacitance of the N-channel transistor. In particular, since driving current for the P-channel transistor can be recovered to the common line and re-utilized for the N-channel transistor, switching loss can be reduced. In addition, the gate voltage of the P-channel transistor swings with the voltage of the common line as a low level. Accordingly, switching loss of the P-channel transistor is reduced in comparison with that where the ground voltage is a low level. Similarly, the gate voltage of the N-channel transistor swings with the voltage of the common line as a high level. Accordingly, switching loss of the N-channel transistor is reduced in comparison with that where the power supply voltage is a high level.

SUMMARY

However, since the common line in Patent Document 1 is connected to both the lower side power supply terminal of the first driver and the upper side power supply terminal of the second driver, each of the driving voltages for the first driver and the second driver (=difference between the upper side power supply terminal and the lower side power supply terminal) is restricted. For example, in the case where a voltage VCOM of the common line is set to a midpoint voltage VDD/2 (for example, 1.65 V) between a voltage VDD (for example, 3.3 V) of the first line and a voltage VSS (=0 V) of the second line, a driving voltage VDD−VCOM of the first driver and a driving voltage VCOM of the second driver are individually restricted to VDD/2 (for example, 1.65 V).

Therefore, although, in Patent Document 1, switching loss of the P-channel transistor and the N-channel transistor (=power principally required for charging and discharging the gate capacitance) can be reduced, there is the possibility that the heat loss by the on resistance of the transistors may increase and the efficiency improvement effect may be limited.

The present disclosure has been made in view of subject discovered by the inventor of the present application, and it is desirable to provide a DC/DC converter that indicates a higher efficiency.

A control circuit disclosed herein is a control entity for a DC/DC converter including a P-channel transistor and an N-channel transistor and having a configuration (first configuration) that includes a pulse generator configured to generate a first pulse signal for designating turning on/off of the P-channel transistor and a second pulse signal for designating turning on/off of the N-channel transistor such that a state of the DC/DC converter or a load approaches a target value, a first driver configured to drive the P-channel transistor based on the first pulse signal, a second driver configured to drive the N-channel transistor based on the second pulse signal, a first line connected to an upper side power supply terminal of the first driver, a second line connected to a lower side power supply terminal of the second driver, a third line connected to a lower side power supply terminal of the first driver, a fourth line connected to an upper side power supply terminal of the second driver, a first regulator configured to stabilize a voltage of the third line to a first given voltage value between a voltage of the first line and a voltage of the second line, and a second regulator configured to stabilize a voltage of the fourth line to a second given voltage value between the voltage of the first line and the voltage of the second line. A coupling capacitor is connected between the third line and the fourth line.

It is to be noted that the control circuit having the first configuration may be configured such that it further includes a bypass capacitor connected to at least one of the third line and the fourth line (second configuration).

Further, the control circuit having the first or second configuration may be configured such that the DC/DC converter is of the step-down type, and the P-channel transistor is a switching transistor, and the N-channel transistor is a synchronous rectification transistor (third configuration).

Further, the control circuit having the first or second configuration may be configured such that the DC/DC converter is of the step-up type, and the N-channel transistor is a switching transistor and the P-channel transistor is a synchronous rectification transistor (fourth configuration).

Further, the control circuit having one of the first to fourth configurations may be configured such that the control circuit is integrated on one semiconductor substrate (fifth configuration). It is to be noted that the term "integrated" includes a case in which all components of the circuit are formed on a semiconductor substrate and another case in which main components of the circuit are integrated, and some resistor and/or capacitor may be provided outside the semiconductor substrate in order to adjust a circuit constant.

Further, the control circuit having the fifth configuration may be configured such that both the P-channel transistor and the N-channel transistor are integrated with the control circuit (sixth configuration).

Further, control circuit having the first or second configuration may be configured such that the coupling capacitor is integrated in the control circuit (seventh configuration).

Meanwhile, a DC/DC converter disclosed herein has a configuration (eighth configuration) that includes an input terminal configured to receive an input voltage, a switching transistor that is a P-channel transistor and has a first terminal connected to the input terminal, an inductor connected at one end thereof to a second terminal of the switching transistor, an output capacitor connected to an other end of the inductor, a synchronous rectification transistor that is an N-channel transistor and has a first terminal connected to the one end of the inductor and a second terminal grounded, and the control circuit having the third configuration described above and configured to drive the P-channel transistor and the N-channel transistor.

Further, another DC/DC converter disclosed herein may have a configuration (ninth configuration) that includes an input terminal configured to receive an input voltage, an inductor connected at one end thereof to the input terminal, a switching transistor that is an N-channel transistor and has a first terminal connected to an other end of the inductor and a second terminal grounded, a synchronous rectification transistor that is a P-channel transistor and has a first terminal connected to the other end of the inductor, an output capacitor connected to a second terminal of the P-channel transistor, and the control circuit having the fourth configuration described above and configured to drive the P-channel transistor and the N-channel transistor.

Further, a system power supply disclosed herein may have a configuration (tenth configuration) that includes the DC/DC converter having the eighth or ninth configuration described above.

With the present disclosure, a DC/DC converter having a higher efficiency can be provided.

DETAILED DESCRIPTION OF THE PREFERRED EMBODIMENTS

In the following, the present disclosure is described in connection with suitable embodiments with reference to the drawings. Like or similar elements, members, and processes depicted in the drawings are denoted by like reference symbols, and overlapping description is omitted suitably. Further, the embodiments do not restrict the present disclosure and are exemplary to the end, and all features described in the embodiments and combinations of them are not necessarily essences of the present disclosure.

In the present specification, the "state in which a member A is connected to a member B" includes a state in which the member A and the member B are connected physically and directly to each other and another state in which the member A and the member B are connected indirectly through a different member that does not have an influence on the electrical connection state. Similarly, the "state in which a member C is provided between the member A and the member B" includes not only a state in which the member A and the member C or the member B and the member C are connected directly to each other but also a state in which the member A and the member C or the member B and the member C are connected indirectly to each other through a different member that does not have an influence on the electrical connection state.

Further, that "a signal A (voltage, current) complies with a signal B (voltage, current)" signifies that the signal A and the signal B have a correlation, and, more particularly, signifies (1) a case in which the signal A is the signal B; (2) another case in which the signal A varies in proportion to the signal B; (3) a further case in which the signal A is obtained by level shifting of the signal B; (4) a still further case in which the signal A is obtained by amplification of the signal B; (5) a yet further case in which the signal A is obtained by inversion of the signal B; (6) an arbitrary combination of the cases (1) to (5); or the like. It is recognized by those skilled in the art that the range of "compliance" depends upon the types and the uses of the signals A and B.

<First Embodiment>

Figure 1:
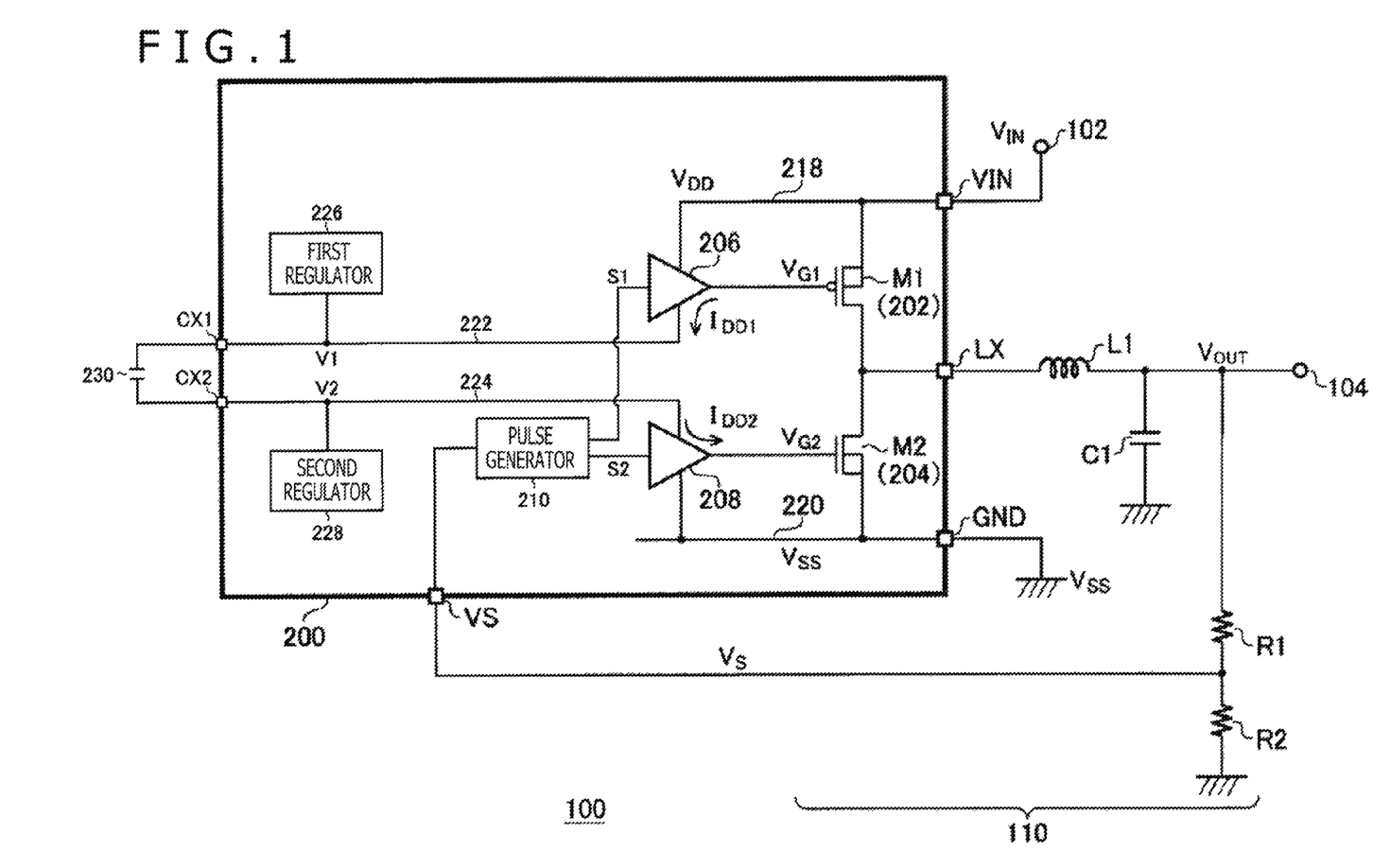
FIG. 1 is a circuit diagram of a DC/DC converter according to a first embodiment.

FIG. 1 is a circuit diagram of a DC/DC converter 100 according to a first embodiment. The DC/DC converter 100 is a synchronous rectification type step-down (Buck) converter, and receives a DC input voltage VIN at an input terminal 102 thereof and generates a stepped down DC output voltage VOUT at an output terminal 104. The DC/DC converter 100 includes an output circuit 110 and a control circuit 200. In the description of the present embodiment, a constant voltage outputting DC/DC converter is described as an example.

The output circuit 110 includes a switching transistor M1, a synchronous rectification transistor M2, an inductor L1, an output capacitor C1, and resistors R1 and R2. It is to be noted that, in the present embodiment, the switching transistor M1 is a P-channel transistor 202 and the synchronous rectification transistor M2 is an N-channel transistor 204, and each of them is configured from a metal oxide semiconductor field effect transistor (MOSFET) and is built in the control circuit 200.

The connection point between the switching transistor M1 and the synchronous rectification transistor M2 is represented as an LX terminal. The inductor L1 is provided between the LX terminal and the output terminal 104. The output capacitor C1 is connected to the output terminal 104. The resistors R1 and R2 divide the output voltage VOUT, which is a control target, into a detection voltage VS, which is supplied to a VS terminal of the control circuit 200. The resistors R1 and R2 may be built in the control circuit 200.

The control circuit 200 includes, in addition to the P-channel transistor 202 that is the switching transistor M1 and the N-channel transistor 204 that is the synchronous rectification transistor M2, a pulse generator 210, a first driver 206, a second driver 208, a first regulator 226, and a second regulator 228 and is a functional integrated circuit (IC) in which they are integrated on one semiconductor substrate. The P-channel transistor 202 is connected at the source thereof to a VIN terminal and at the drain thereof to the LX terminal. Meanwhile, the N-channel transistor 204 is connected at the drain thereof to the LX terminal and at the source thereof to a GND terminal.

The pulse generator 210 generates a first pulse signal S1 for designating turning on/off of the P-channel transistor 202 and a second pulse signal S2 for designating turning on/off of the N-channel transistor 204 such that the state of the DC/DC converter 100 or a load may approach a target value therefor. As described hereinabove, the DC/DC converter 100 indicates a constant voltage output, and the pulse generator 210 determines the DC output voltage VOUT of the DC/DC converter 100 as a control target. More particularly, the pulse generator 210 generates the pulse signals S1 and S2 such that the detection voltage VS fed back to the VS terminal may approach a target value VREF therefor.

The pulse generator 210 may be configured using a well-known technology and is not specifically restricted in terms of the control method and configuration. For the control method, a voltage mode, a peak current mode, an average current mode, hysteresis control (Bang-Bang control), a bottom detection on-time fixed (constant on time (COT)) method or the like can be adopted. Meanwhile, as the modulation method for the pulse signals S1 and S2, pulse width modulation, pulse frequency modulation or the like can be adopted. As regards the configuration of the pulse generator 210, it may be configured from an analog circuit in which an error amplifier or a comparator is used, or from a processor that performs a digital arithmetic operation process or else from a combination of an analog circuit and a digital circuit. Further, the control method for the pulse generator 210 may be switched in response to the state of a load thereto.

The first driver 206 generates a gate voltage VG1 on the basis of the first pulse signal S1 to drive the P-channel transistor 202. It is to be noted that a first line 218 of the high potential side is connected to an upper side power supply terminal of the first driver 206, and in the example of FIG. 1, a power supply voltage VDD (=DC input voltage VIN) is applied to the upper side power supply terminal of the first driver 206 through the VIN terminal. It is to be noted that the first line 218 may be connected to a power supply circuit not depicted. Meanwhile, a third line 222 of the low potential side may be connected to a lower side power supply terminal of the first driver 206, and a voltage V1 (details are hereinafter described) is applied to the lower side power supply terminal of the first driver 206 from the first regulator 226. Accordingly, the gate voltage VG1 swings with the amplitude of VDD−V1.

The second driver 208 generates a gate voltage VG2 on the basis of the second pulse signal S2 to drive the N-channel transistor 204. It is to be noted that a second line 220 of the low potential side is connected to a lower side power supply terminal of the second driver 208, and a ground voltage VSS is applied to the lower side power supply terminal of the second driver 208 through the GND terminal. Meanwhile, to an upper side power supply terminal of the first driver 206, a fourth line 224 of the high potential side is connected, and a voltage V2 (details are hereinafter described) is supplied to the upper side power supply terminal of the first driver 206 from the second regulator 228. Accordingly, the gate voltage VG2 swings with the amplitude of V2−VSS.

The first regulator 226 stabilizes the voltage V1 of the third line 222 to a first predetermined voltage value between the power supply voltage VDD of the first line 218 and the ground voltage VSS of the second line 220. Meanwhile, the second regulator 228 stabilizes the voltage V2 of the fourth line 224 to a second predetermined voltage value between the power supply voltage VDD and the ground voltage VSS.

It is to be noted that the voltages V1 and V2 may be determined so as to satisfy VDD−V1>VTHP and V2−VSS>VTHN where VTHP is a gate-source threshold value voltage of the P-channel transistor 202 and VTHN is a gate-source threshold value voltage of the N-channel transistor 204.

The first regulator 226 and the second regulator 228 may each be a linear regulator or a switching regulator (DC/DC converter) or else a voltage clamp circuit, and are not specifically restricted in terms of the configuration only if they can stabilize the voltages V1 and V2 individually within desired voltage ranges.

Generally, if a P-channel MOSFET and an N-channel MOSFET are compared with each other, then in order to obtain a same current supplying capacity (on-resistance), the P-channel MOSFET has a great device size. As it is in many power supply circuit, in the case where the on-resistances of the P-channel transistor 202 and the N-channel transistor 204 are adjusted to each other, the transistor size of the P-channel transistor 202 is greater than the size of the N-channel transistor 204. In this case, since the gate capacitance CG1 of the P-channel transistor 202 is higher than the gate capacitance CG2 of the N-channel transistor 204, if the current IDD1 flowing out from the lower side power supply terminal of the first driver 206 and the current IDD2 flowing into the upper side power supply terminal of the second driver 208 are compared with each other, then IDD1>IDD2.

Further, a coupling capacitor 230 is connected to the third line 222 and the fourth line 224. In particular, when the voltage V1 increases by the current IDD1 flowing out from the lower side power supply terminal of the first driver 206, also the voltage V2 increases similarly by the charge conservation law of the coupling capacitor 230. Accordingly, when the current IDD2 is to be supplied to the upper side power supply terminal of the second driver 208, charge accumulated in the coupling capacitor 230 by the current IDD1 is utilized.

By potentially separating the lower side power supply terminal of the first driver 206 and the upper side power supply terminal of the second driver 208 from each other and capacitively coupling them to each other in this manner, the current IDD1 can be re-utilized as the current IDD2 while the voltages V1 and V2 are set arbitrarily. Accordingly, since the driving voltages for the first driver 206 and the second driver 208 (and hence the amplitudes of the gate voltages VG1 and VG2) can be secured, the switching loss of the transistors can be reduced while increase of the heat loss by the on-resistance of the P-channel transistor 202 and the N-channel transistor 204 is suppressed (details are hereinafter described).

It is to be noted that, while FIG. 1 depicts a configuration example in which the CX1 terminal and the CX2 terminal are provided for the control circuit 200 and the coupling capacitor 230 is externally provided between the CX1 terminal and the CX2 terminal, also it is possible to integrate the coupling capacitor 230 in the control circuit 200.

The configuration of the DC/DC converter 100 according to the first embodiment is such as described above. Now, operation of the control circuit 200 is described.

<First Operation Example>

Figure 2:
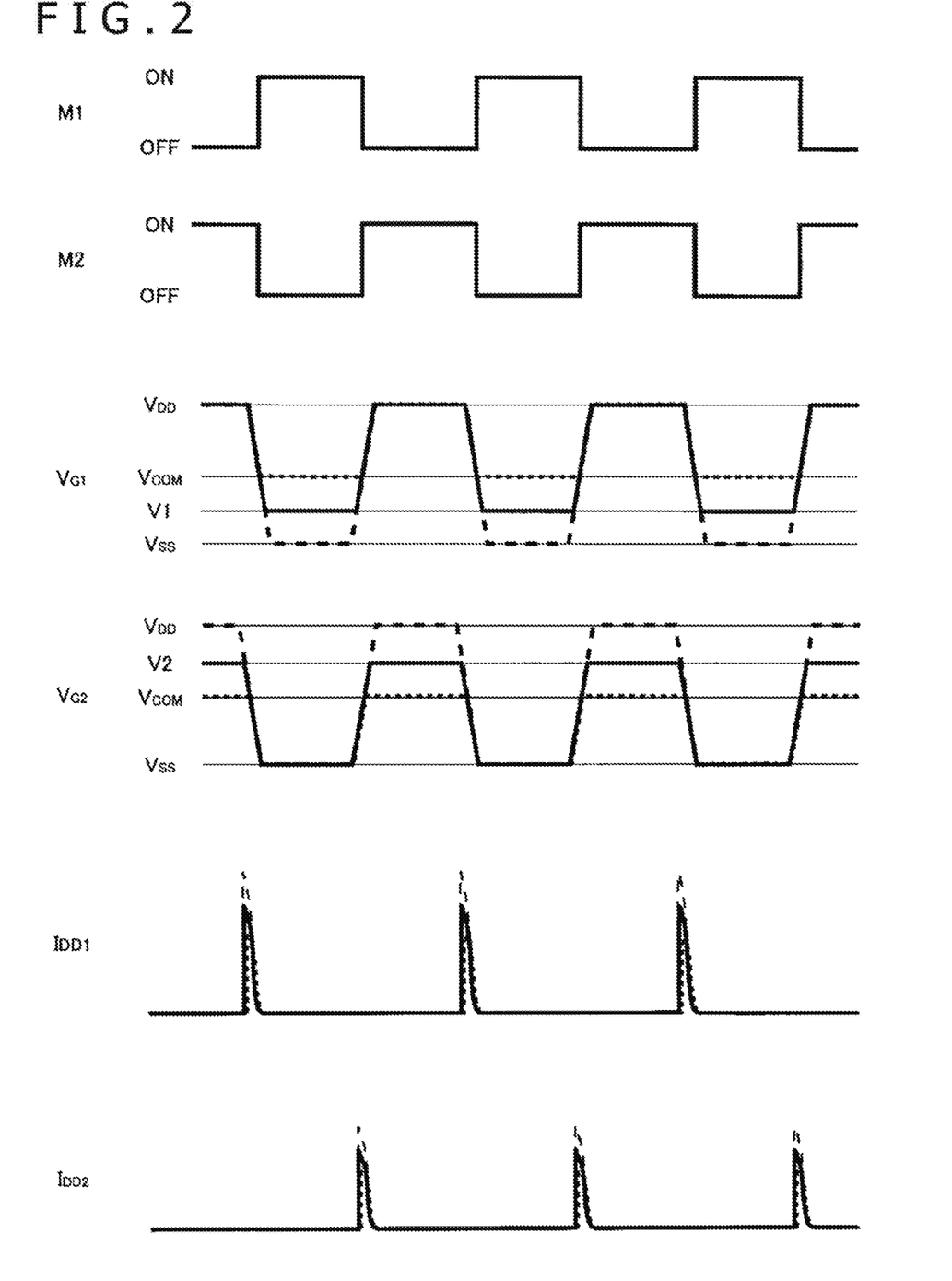
FIG. 2 is an operation waveform diagram depicting a first operation example of a control circuit.

FIG. 2 is an operation waveform diagram illustrating a first operation example of the control circuit 200. In FIG. 2, an on/off state of the switching transistor M1, an on/off state of the synchronous rectification transistor M2, a gate voltage VG1 of the switching transistor M1, a gate voltage VG2 of the synchronous rectification transistor M2, current IDD1 of the first driver 206, and current IDD2 of the second driver 208 are depicted.

It is to be noted that, although, in the actual control circuit 200, a dead time period for preventing the switching transistor M1 and the synchronous rectification transistor M2 from simultaneously turning on is inserted, in order to simplify the description, the dead time period is ignored in FIG. 2.

Further, regarding the gate voltages VG1 and VG2 and the current IDD1 and IDD2, a solid line indicates a behavior in the present disclosure. Meanwhile, a short broken line indicates a behavior of a first comparative example and particularly indicates a behavior (=behavior disclosed in Patent Document 1) when a common line is connected to both the lower side power supply terminal of the first driver 206 and the upper side power supply terminal of the second driver 208 and both terminals are stabilized to a common voltage VCOM (=VDD/2). Further, a long broken line indicates a behavior of a second comparative example and indicates a behavior when both the lower side power supply terminal of the first driver 206 and the upper side power supply terminal of the second driver 208 are grounded.

First, the first comparative example (short broken line) is described. The first driver 206 drives the gate voltage VG1 to the common voltage VCOM within an on period of the switching transistor M1, and drives the gate voltage VG1 to the power supply voltage VDD within an off period of the switching transistor M1. In particular, the gate voltage VG1 swings with an amplitude of VDD−VCOM. Here, the first driver 206 sources current to the gate of the switching transistor M1 upon turning off of the switching transistor M1 and sinks current from the gate of the switching transistor M1 upon turning off of the switching transistor M1. In FIG. 2, this sink current is indicated as current IDD1 that flows out from the lower side power supply terminal of the first driver 206.

On the other hand, the second driver 208 drives the gate voltage VG2 to the common voltage VCOM within an on period of the synchronous rectification transistor M2 and drives the gate voltage VG2 to the ground voltage VSS within an off period of the synchronous rectification transistor M2. In particular, the gate voltage VG2 swings with an amplitude of VCOM−VSS. Here, the second driver 208 sinks current from the gate of the synchronous rectification transistor M2 upon turning off of the synchronous rectification transistor M2 and sources current to the gate of the synchronous rectification transistor M2 upon turning off of the synchronous rectification transistor M2. In FIG. 2, this source current is indicated as current IDD2 that flows into the upper side power supply terminal of the second driver 208.

It is to be noted that, in the first comparative example (short broken line), the current IDD1 flowing to the first driver 206 is recovered to the common line once and is utilized as the current IDD2 to the second driver 208. Especially in the case where IDD1>IDD2, the current IDD2, namely, power required for switching of the N-channel transistor 204, can be supplied fully with the current from the first driver 206.

This point is described in contrast to the second comparative example (long broken line). According to the second comparative example (long broken line), when the gate voltage VG1 of the switching transistor M1 that is a P-channel transistor is changed to the low level, the discharge current of the switching transistor M1 is sunk by the first driver 206 and discarded to the ground. In addition, when the gate voltage VG2 of the synchronous rectification transistor M2 that is an N-channel transistor is changed to the low level, the discharge current of the synchronous rectification transistor M2 is sunk by the second driver 208 and discarded to the ground. Where the gate capacitance of the switching transistor M1 is represented by CG1, the gate capacitance of the synchronous rectification transistor M2 by CG2, and the switching frequency by f, each current I1 and I2 for switching the switching transistor M1 and the synchronous rectification transistor M2 is represented by the following expressions (1A) and (1B), and the entire DC/DC converter 100 suffers from switching loss of I1+I2.

$$I1 = f \times CG1 \times (VDD - VSS) \qquad (1A)$$

$$I2 = f \times CG2 \times (VDD - VSS) \qquad (1B)$$

On the other hand, in the first comparative example (short broken line), the current I2 is fully covered by the current I1. Therefore, only the current I1 becomes switching loss to the DC/DC converter 100 as a whole. In this manner, with the first comparative example (short broken line), the switching loss can be reduced in comparison with the second comparative example (long broken line).

Further, in the first comparative example (short broken line), since the gate voltage VG1 of the P-channel transistor 202 swings from the low level given by the common voltage VCOM, the current I1 required for switching of the P-channel transistor 202 is given by the following expression (2A).

$$I1 = f \times CG1 \times (VDD - VCOM) \qquad (2A)$$

If the expression (2A) is compared with the expression (1A), then since VCOM>VSS, the current I1 of the expression (2A) is lower, and therefore the switching loss of the P-channel transistor 202 is reduced.

Similarly, since the gate voltage VG2 of the N-channel transistor 204 swings from the high level given by the common voltage VCOM, the current I2 required for switching of the N-channel transistor 204 is given by the following expression (2B).

$$I2 = f \times CG2 \times (VCOM - VSS) \qquad (2B)$$

If the expression (2B) is compared with the expression (1B), then since VCOM<VDD, the current I2 of the expression (2B) is lower, and therefore, the switching loss of the N-channel transistor 204 is reduced.

However, in the first comparative example (short broken line), since the common voltage VCOM is applied to both the lower side power supply terminal of the first driver 206 and the upper side power supply terminal of the second driver 208, the driving voltage (=different between the upper side power supply voltage and the lower side power supply voltage) to the first driver 206 and the second driver 208 is restricted. For example, in the case where the common voltage VCOM is set to a midpoint voltage VDD/2 (for example, 1.65 V) between the power supply voltage VDD (for example, 3.3 V) and the ground voltage VSS (=0 V), the driving voltage VDD−VCOM for the first driver 206 and the common voltage VCOM for the second driver 208 are individually restricted to VDD/2 (for example, 1.65 V).

Therefore, with the first comparative example (short broken line), although the switching loss of the P-channel transistor 202 and the N-channel transistor 204 (=power required to cause the gate capacitances CG1 and CG2 to charge and discharge) can be reduced, the heat loss by the on-resistance of the transistors increases, resulting in the possibility that the efficiency improvement effect may become restrictive.

On the other hand, with the present disclosure (solid line), since the lower side power supply terminal of the first driver 206 and the upper side power supply terminal of the second driver 208 are separated in potential from each other and are coupled to each other by capacitive coupling, it becomes possible to arbitrarily set the voltages V1 and V2.

For example, in the case where VDD=3.3 V and VSS=0 V, if the voltages V1 and V2 are set to V1=1.1 V and V2=2.2 V, then 2.2 V can be secured for both the driving voltage VDD–V1 for the first driver 206 and the driving voltage V2–VSS for the second driver 208.

In particular, while, with the first comparative example (short broken line), the driving voltages for the first driver 206 and the second driver 208 are both restricted to 1.65 V, with the present disclosure (solid line), the driving voltages can be increased to 2.2 V.

Accordingly, since the amplitudes of the voltages VG1 and VG2 can be increased from those of the first comparative example (short broken line), the switching loss of each transistor can be reduced while increase of the heat loss by the on-resistance of the P-channel transistor 202 and the N-channel transistor 204 is suppressed.

It is to be noted that, although the heat loss by the on-resistance can be reduced if the driving voltages for the first driver 206 and the second driver 208 are increased, as a contrary, charge necessary for gate driving increases. Therefore, it is preferable to set the voltages V1 and V2 so as to become driving voltages with which the highest efficiency is obtained in response to characteristics of the P-channel transistor 202 and the N-channel transistor 204.

In the case where IDD1>IDD2, the difference between the current IDD1 and the current IDD2 (namely, surplus current) is consumed wastefully by the first regulator 226. In such a case as just described, a circuit block (load) different from the second driver 208 may be connected to the CX2 terminal. This makes it possible to effectively utilize the surplus current IDD1–IDD2.

<Second Operation Example>

Figure 3:
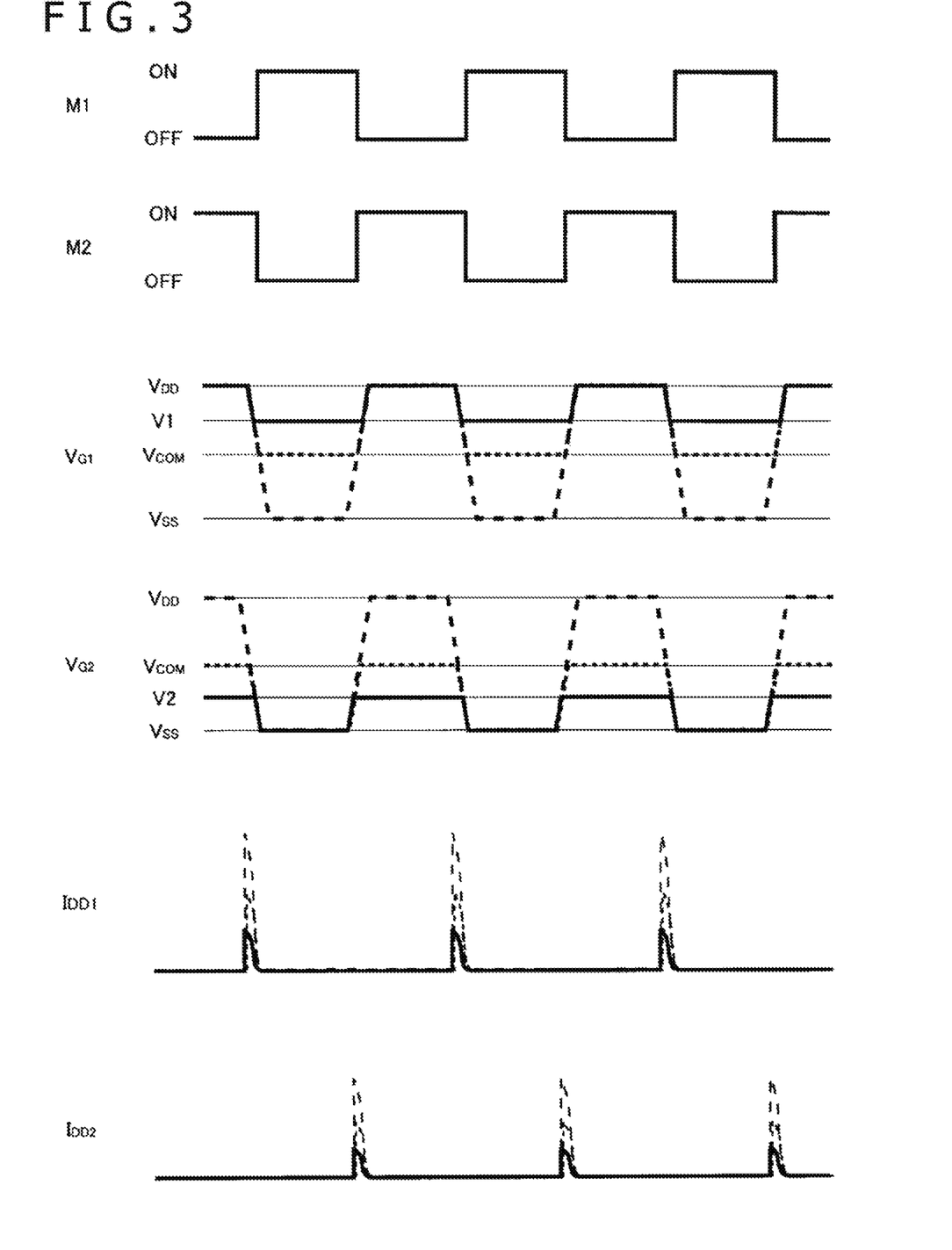
FIG. 3 is an operation waveform diagram depicting a second operation example of the control circuit.

FIG. 3 is an operation waveform diagram illustrating a second operation example of the control circuit 200. In FIG. 3, an on/off state of the switching transistor M1, an on/off state of the synchronous rectification transistor M2, a gate voltage VG1 of the switching transistor M1, a gate voltage VG2 of the synchronous rectification transistor M2, current IDD1 of the first driver 206, and current IDD2 of the second driver 208 are depicted similarly as in FIG. 2.

Although, in the first operation example (FIG. 2) described above, the driving voltages for the first driver 206 and the second driver 208 are set such that they have voltage values higher than that of the first comparative example (short broken line) (V1<VCOM<V2), also it is possible to set the driving voltages lower than that of the first comparative example (short broken line) (V2<VCOM<V1).

For example, in the case where VDD=15 V and VSS=0 V, if the voltages V1 and V2 are set to V1=12.8 V and V2=2.2 V, then 2.2 V can be secured as both the driving voltage VDD–V1 for the first driver 206 and the driving voltage V2–VSS for the second driver 208.

In particular, even in a situation in which, with the first comparative example (short broken line), the driving voltages of the first driver 206 and the second driver 208 indicate an excessively high voltage (=7.5 V), with the present disclosure (solid line), the driving voltages can be maintained at a more appropriate voltage value (=2.2 V).

Especially, in the case in which the power supply voltage VDD is excessively high in comparison with a gate-source threshold value voltage VTHP of the P-channel transistor 202 and the gate-source threshold value voltage VTHN of the N-channel transistor 204, it is preferable to adopt the second operation example of FIG. 3.

<Bypass Capacitor>

Figure 4:
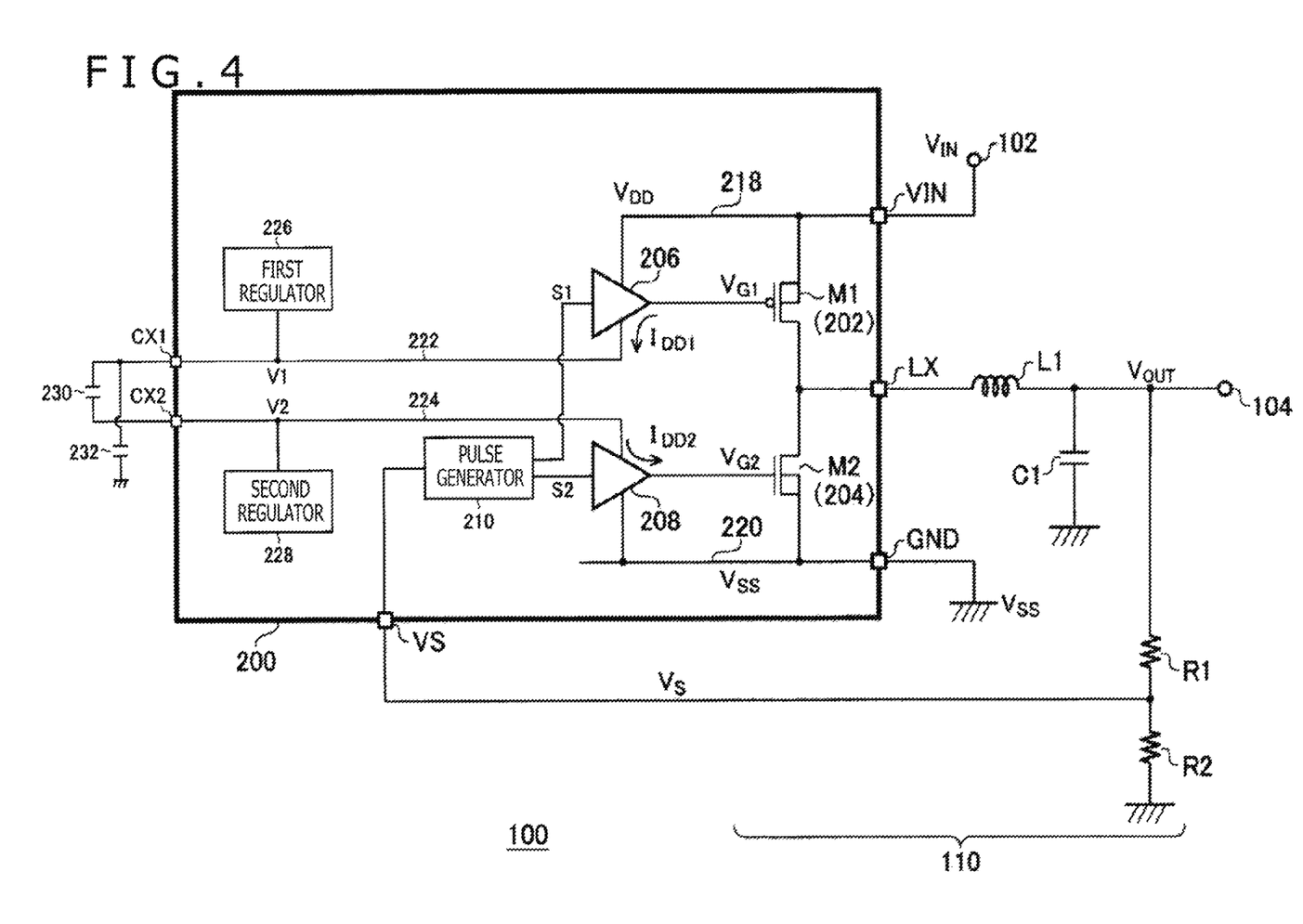
FIG. 4 is a circuit diagram depicting a first connection example of a bypass capacitor.
Figure 5:
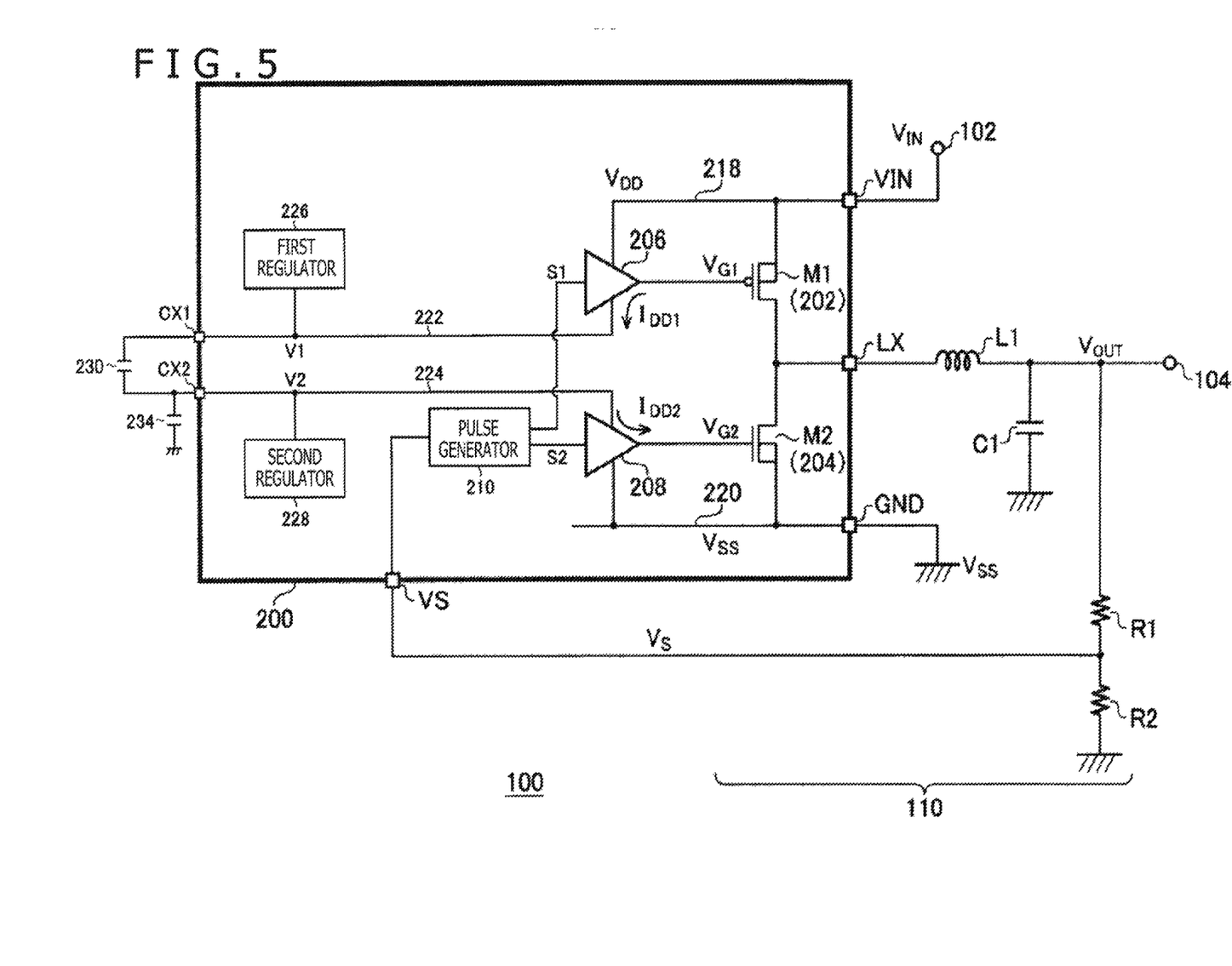
FIG. 5 is a circuit diagram depicting a second connection example of the bypass capacitor.
Figure 6:
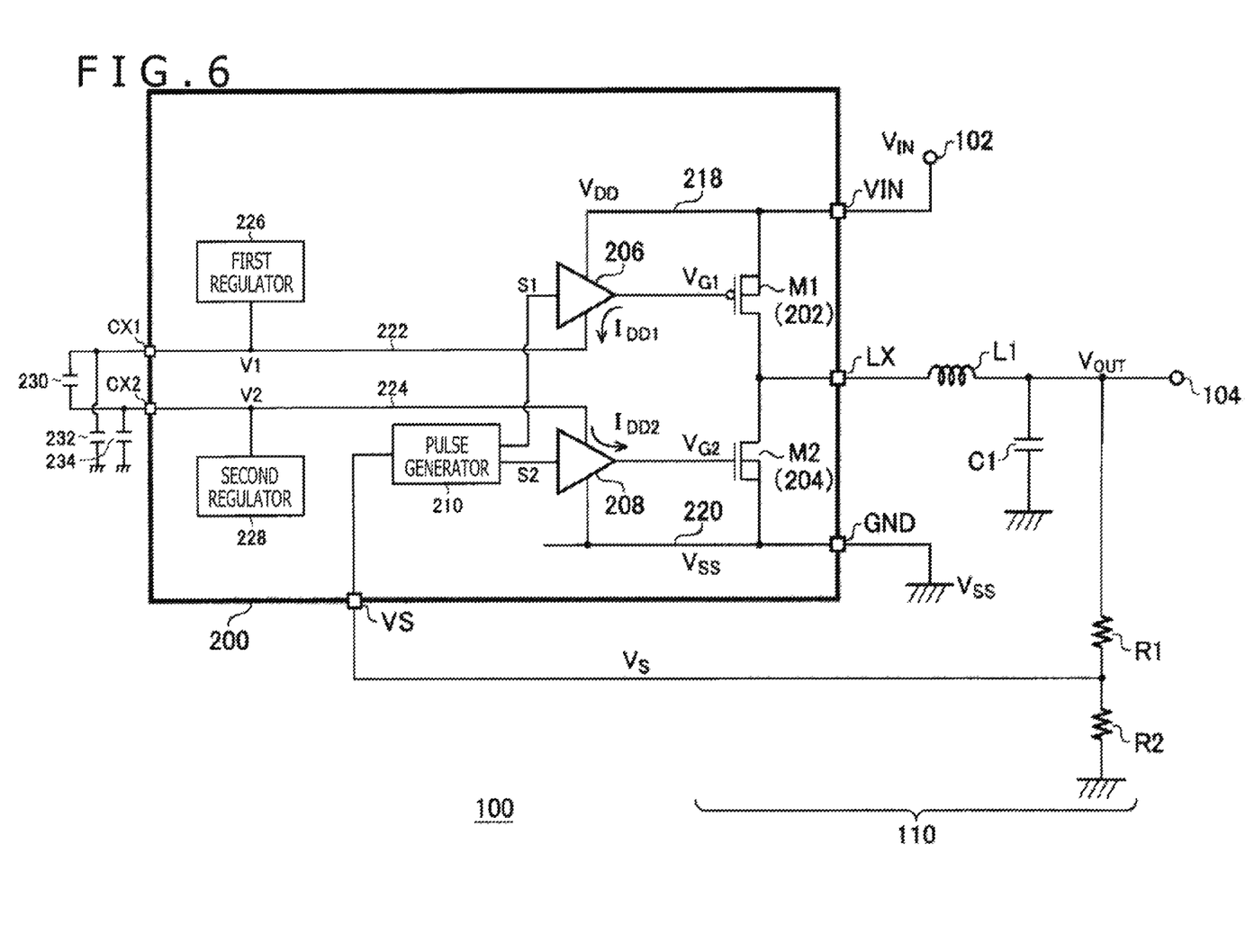
FIG. 6 is a circuit diagram depicting a third connection example of the bypass capacitor.

FIGS. 4 to 6 are circuit diagrams depicting first to third connection examples of a bypass capacitor in the DC/DC converter 100.

In the first connection example of FIG. 4, a bypass capacitor 232 is connected between the CX1 terminal and the ground terminal. Meanwhile, in the second connection example of FIG. 5, a bypass capacitor 234 is connected between the CX2 terminal and the ground terminal. Further, in the third connection example of FIG. 6, bypass capacitors 232 and 234 are connected to both the CX1 terminal and the CX2 terminal.

By connecting the bypass capacitor 232 or 234 to at least one of the CX1 terminal and the CX2 terminal (thus, to the third line 222 and the fourth line 224) in this manner, it becomes easier to stabilize the voltages V1 and V2.

It is to be noted that the bypass capacitors 232 and 234 may be built in the control circuit 200 similarly to the coupling capacitor 230.

<Second Embodiment>

Figure 7:
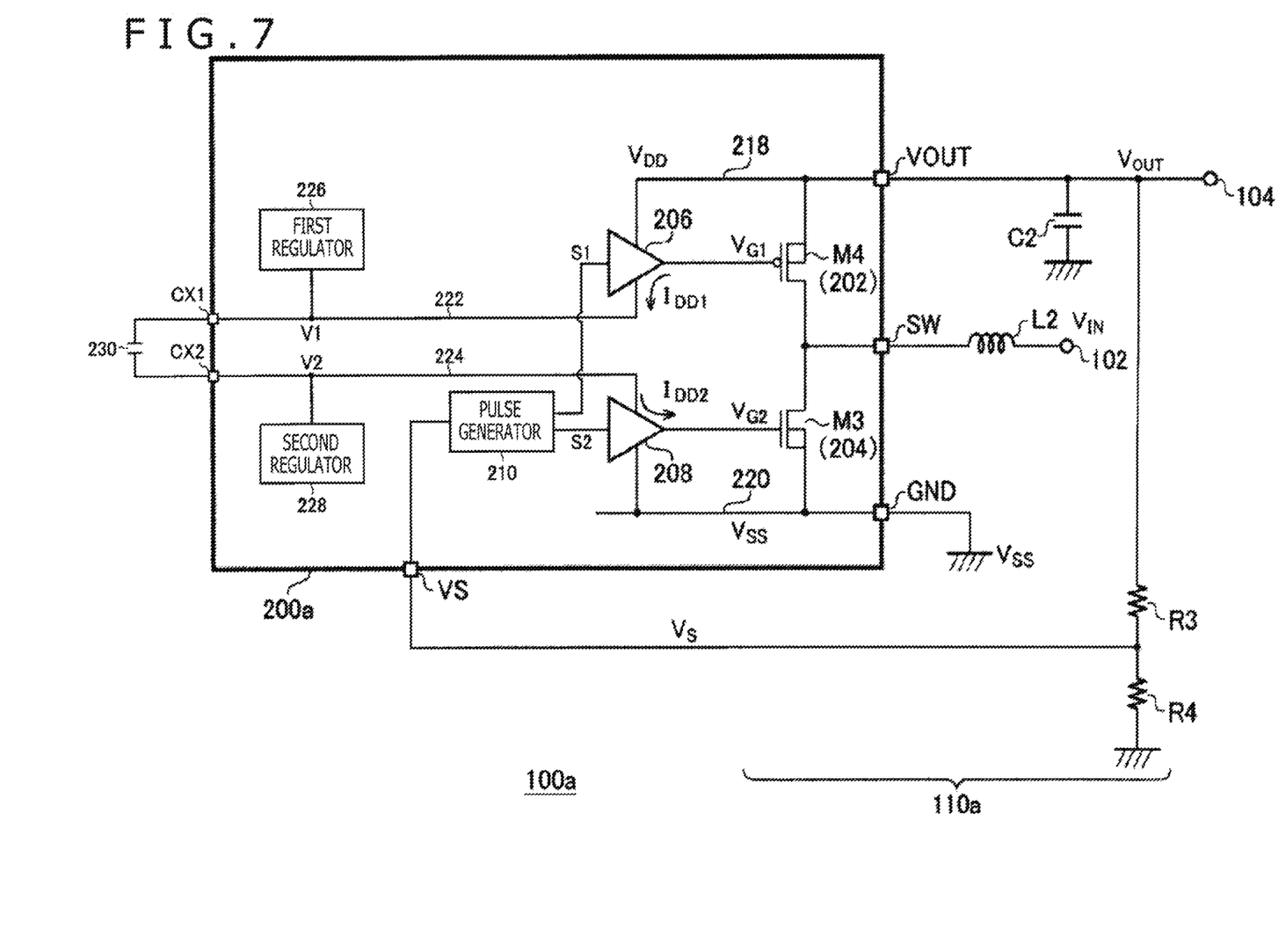
FIG. 7 is a circuit diagram of a DC/DC converter according to a second embodiment.

FIG. 7 is a circuit diagram of a DC/DC converter 100a according to a second embodiment. The DC/DC converter 100a is a step-up (Boost) converter of the synchronous rectification type, and receives a DC input voltage VIN at an input terminal 102 thereof, and generates a stepped up DC output voltage VOUT at an output terminal 104. The DC/DC converter 100a includes an output circuit 110a and a control circuit 200a.

The output circuit 110a includes a switching transistor M3, a synchronous rectification transistor M4, an inductor L2, an output capacitor C2, and resistors R3 and R4. In the present embodiment, the switching transistor M3 is an N-channel transistor 204 and the synchronous rectification transistor M4 is a P-channel transistor 202, and each of them is configured each from a MOSFET. The control circuit 200a has a configuration substantially same as that of the control circuit 200 of FIG. 1.

Also in the DC/DC converter 100a of FIG. 7, the switching loss can be reduced while the heat loss by on-resistance is suppressed similarly as in the DC/DC converter 100 of the first embodiment.

<System Power Supply>

Figure 8:
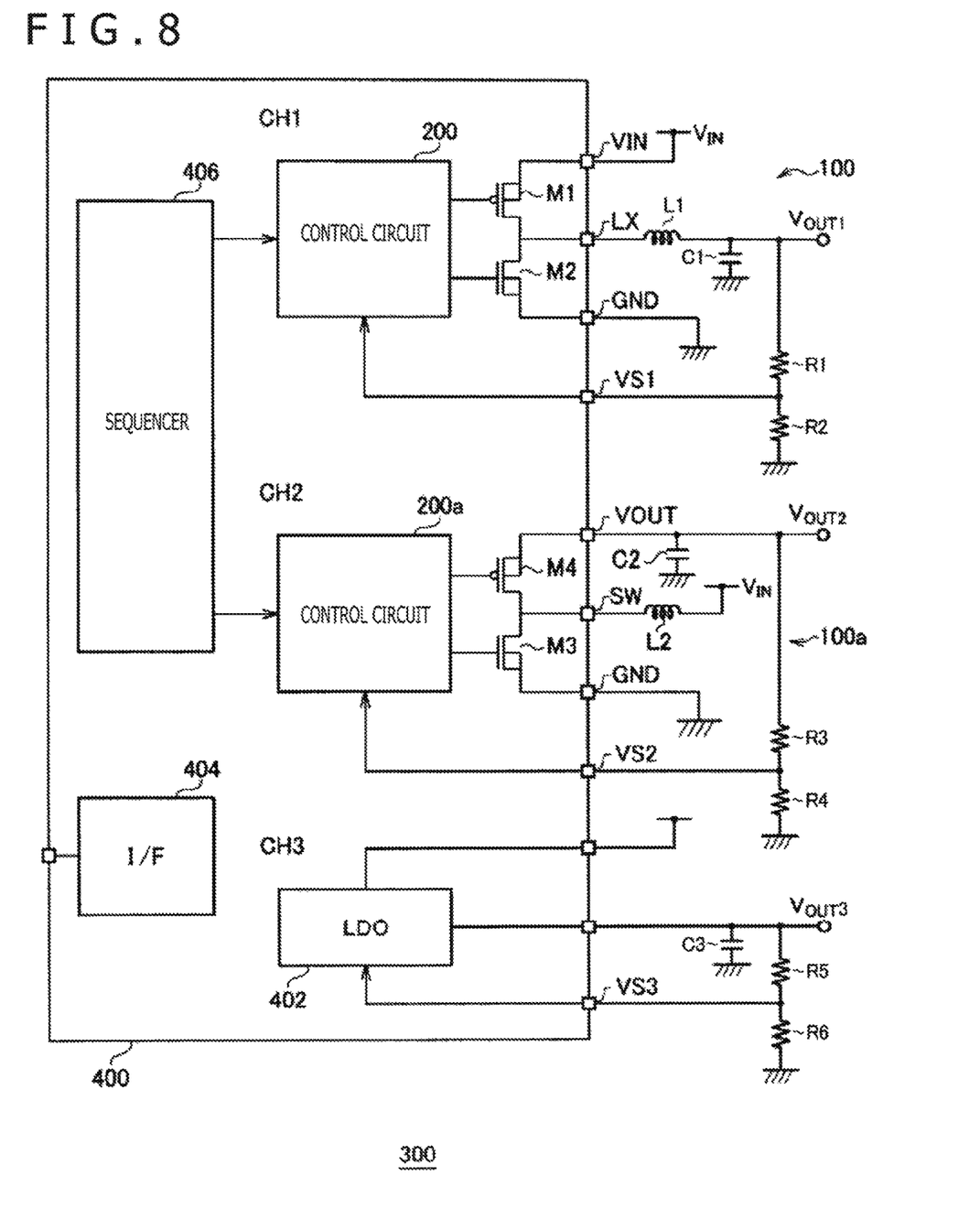
FIG. 8 is a block diagram of a system power supply for which a DC/DC converter is utilized.

Finally, an exemplary application of a DC/DC converter is described. FIG. 8 is a block diagram of a system power supply 300 that utilizes the DC/DC converter according to an embodiment.

The system power supply 300 has a multichannel (in the present embodiment, a 3-channel) configuration and generates power supply voltages VOUT1 to VOUT3 different among different channels CH1 to CH3 such that they can be supplied to various loads.

The system power supply 300 may include an arbitrary combination of the DC/DC converter 100 of the step-down type, DC/DC converter 100a of the step-up type and linear regulator. In FIG. 8, the DC/DC converter 100 is for the first channel CH1 and the DC/DC converter 100a is for the second channel CH2 while the linear regulator (low drop output (LDO)) is for the third channel. It is to be noted that the linear regulator may be provided for a plurality of channels.

The system power supply 300 includes a power management IC 400 and other peripheral circuit parts. The power management IC 400 includes a control circuit 200 for the DC/DC converter 100, a control circuit 200a for the DC/DC converter 100a, a linear regulator 402, an interface circuit 404, a sequencer 406 and so forth. Further, various protection circuits and so forth are built in the power management IC 400.

The interface circuit 404 is provided in order to transmit and receive a control signal or data to and from an external host processor (not depicted). For example, the interface circuit 404 may comply with the inter IC (I2C) bus. The sequencer 406 controls an order and timings of activation of a multichannel power supply circuit.

The present disclosure has been described on the basis of the embodiments thereof. The embodiments are exemplary, and it will be recognized by those skilled in the art that various modifications to the combinations of the components and processes of the embodiments are possible and that also such modifications fall within the scope of the disclosure. Such modifications are described below.

<First Modification>

In FIG. 1, the P-channel transistor 202 and the N-channel transistor 204 may individually be attached externally to the control circuit 200. Similarly, in FIG. 7, the P-channel transistor 202 and the N-channel transistor 204 may individually be attached externally to the control circuit 200a.

<Second Modification>

Further, while the embodiments described hereinabove are directed to a case in which both the P-channel transistor 202 and the N-channel transistor 204 are MOSFETs, the present disclosure is not limited to this, and each of them may otherwise be an insulated gate bipolar transistor (IGBT).

<Third Modification>

Further, the present disclosure can be applied also to a step-up and step-down converter that includes two pairs of a P-channel transistor and an N-channel transistor.

<Other Modifications>

The various technical features disclosed herein can be altered in various manners without departing from the technical scope of the present disclosure in addition to the embodiments described hereinabove. For example, mutual substitution of a bipolar transistor and a MOS field effect transistor and logical level inversion of the various signals may be applied arbitrarily. In other words, the embodiments are construed that they are exemplary in all respects and are not respective, and the technical scope of the present disclosure shall not be restricted to the embodiments described above and shall be construed that it includes all alterations that belong to the meanings and the scope equivalent to the claims.

The present disclosure can be utilized in power supply circuits.

The present disclosure contains subject matter related to that disclosed in Japanese Priority Patent Application JP 2017-096490 filed in the Japan Patent Office on May 15, 2017, the entire content of which is hereby incorporated by reference.

It should be understood by those skilled in the art that various modifications, combinations, sub-combinations and alterations may occur depending on design requirements and other factors insofar as they are within the scope of the appended claims or the equivalent thereof.

What is claimed is:

1. A control circuit for a direct current-to-direct current converter, the control circuit comprising:
   a pulse generator configured to generate a first pulse signal that turns on/off a positive-channel transistor and a second pulse signal that turns on/off a negative-channel transistor such that one of a state of the direct current-to-direct current converter or a load approaches a target value;
   a first driver configured to drive the positive-channel transistor based on the first pulse signal;
   a second driver configured to drive the negative-channel transistor based on the second pulse signal;
   a first line connected to an upper side power supply terminal of the first driver;
   a second line connected to a lower side power supply terminal of the second driver;
   a third line connected to a lower side power supply terminal of the first driver;
   a fourth line connected to an upper side power supply terminal of the second driver;
   a first regulator configured to stabilize a voltage of the third line to a first given voltage value between a voltage of the first line and a voltage of the second line;
   a second regulator configured to stabilize a voltage of the fourth line to a second given voltage value between the voltage of the first line and the voltage of the second line; and
   a coupling capacitor directly connected between the third line and the fourth line, wherein
      a first current that flows from the third line charges the coupling capacitor, and
      the coupling capacitor discharges to provide a second current that flows into the fourth line.

2. The control circuit according to claim 1, further comprising:
   a bypass capacitor connected to at least one of the third line or the fourth line.

3. The control circuit according to claim 1, wherein the direct current-to-direct current converter is of a step-down type, and the positive-channel transistor is a switching transistor and the negative-channel transistor is a synchronous rectification transistor.

4. The control circuit according to claim 1, wherein the direct current-to-direct current converter is of a step-up type, and the negative-channel transistor is a switching transistor and the positive-channel transistor is a synchronous rectification transistor.

5. The control circuit according to claim 1, wherein the control circuit is integrated on one semiconductor substrate.

6. The control circuit according to claim 5, wherein both the positive-channel transistor and the negative-channel transistor are integrated with the control circuit.

7. The control circuit according to claim 5, wherein the coupling capacitor is integrated with the control circuit.

8. The control circuit according to claim 1, wherein the first driver has an output terminal connected with a gate terminal of the positive-channel transistor, and wherein the first driver is further configured to generate a first gate voltage based on the first pulse signal.

9. The control circuit according to claim 1, wherein the second driver has an output terminal connected with a gate terminal of the negative-channel transistor, and wherein the second driver is further configured to generate a second gate voltage based on the second pulse signal.

10. A direct current-to-direct current converter, comprising: an input terminal configured to receive an input voltage; a switching transistor that is a positive-channel transistor and has a first terminal connected to the input terminal; an inductor that has a first end connected to a second terminal of the switching transistor; an output capacitor connected to a second end of the inductor; a synchronous rectification transistor that is a negative-channel transistor and has a first terminal connected to the first end of the inductor and a second terminal grounded; and a control circuit, in which the direct current-to-direct current converter is of a step-down type, comprising: a first driver configured to drive the positive-channel transistor, a second driver configured to drive the negative-channel transistor, a first line connected to a lower side power supply terminal of the first driver, a second line connected to an upper side power supply terminal of the second driver, and a coupling capacitor directly connected between the third line and the fourth line, wherein a first current that flows from the third line charges the coupling capacitor, and the coupling capacitor discharges to provide a second current that flows into the fourth line.

11. A direct current-to-direct current converter, comprising: an input terminal configured to receive an input voltage; an inductor that has a first end connected to the input terminal; a switching transistor that is a negative-channel transistor and has a first terminal connected to a second end of the inductor and a second terminal grounded; a synchronous rectification transistor that is a positive-channel transistor and has a first terminal connected to the second end of the inductor; an output capacitor connected to a second terminal of the positive-channel transistor; and a control circuit, in which the direct current-to-direct current converter is of a step-up type, comprising: a first driver configured to drive the positive-channel transistor, a second driver configured to drive the negative-channel transistor, a first line connected to a lower side power supply terminal of the first driver, a second line connected to an upper side power supply terminal of the second driver, and a coupling capacitor directly connected between the third line and the fourth line, wherein a first current that flows from the third line charges the coupling capacitor, and the coupling capacitor discharges to provide a second current that flows into the fourth line.

12. A system power supply, comprising; a direct current-to-direct current converter including: an input terminal configured to receive an input voltage, a switching transistor that is a positive-channel transistor and has a first terminal connected to the input terminal, an inductor that has a first end connected to a second terminal of the switching transistor, an output capacitor connected to a second end of the inductor, a synchronous rectification transistor that is a negative-channel transistor and has a first terminal connected to the first end of the inductor and a second terminal grounded, and a control circuit, in which the direct current-to-direct current converter is of a step-down type, comprising: a first driver configured to drive the positive-channel transistor, a second driver configured to drive the negative-channel transistor, a first line connected to a lower side power supply terminal of the first driver, a second line connected to an upper side power supply terminal of the second driver, and a coupling capacitor directly connected between third line and the fourth line, wherein a first current that flows from the third line charges the coupling capacitor, and the coupling capacitor discharges to provide a second current that flows into the fourth line.

13. A system power supply, comprising: a direct current-to-direct current converter including: an input terminal configured to receive an input voltage, an inductor that has a first end connected to the input terminal, a switching transistor that is a negative-channel transistor and has a first terminal connected to a second end of the inductor and a second terminal grounded, a synchronous rectification transistor that is a positive-channel transistor and has a first terminal connected to the second end of the inductor, an output capacitor connected to a second terminal of the positive-channel transistor, and a control circuit, in which the direct current-to-direct current converter is of a step-up type, comprising: a first driver configured to drive the positive-channel transistor, a second driver configured to drive the negative-channel transistor, a first line connected to a lower side power supply terminal of the first driver, a second line connected to an upper side power supply terminal of the second driver, and a coupling capacitor directly connected between third line and the fourth line, wherein a first current that flows from the third line charges the coupling capacitor, and the coupling capacitor discharges to provide a second current that flows into the fourth line.

* * * * *